United States Patent [19]

Moshier

[11] 4,038,503
[45] July 26, 1977

[54] SPEECH RECOGNITION APPARATUS

[75] Inventor: Stephen L. Moshier, Cambridge, Mass.

[73] Assignee: Dialog Systems, Inc., Cambridge, Mass.

[21] Appl. No.: 644,722

[22] Filed: Dec. 29, 1975

[51] Int. Cl.² ............................................. G10L 1/00
[52] U.S. Cl. .................................................. 179/1 SA
[58] Field of Search .......................... 179/1 SA, 1 SD

[56] References Cited

U.S. PATENT DOCUMENTS

| | | | |
|---|---|---|---|
| 2,903,515 | 9/1959 | Smith | 179/1 SA |
| 3,069,507 | 12/1962 | David | 179/1 SA |
| 3,091,665 | 5/1963 | Schroeder | 179/1 SA |
| 3,499,990 | 3/1970 | Clapper | 179/1 SA |
| 3,553,372 | 1/1971 | Wright | 179/1 SD |
| 3,588,363 | 6/1971 | Hersher | 179/1 SD |
| 3,812,291 | 5/1974 | Brodes et al. | 179/1 SA |
| 3,816,722 | 6/1974 | Sakoe | 179/1 SA |
| 3,919,481 | 11/1975 | Kalfaran | 179/1 SA |
| 3,925,761 | 12/1975 | Chaires et al. | 179/1 SA |

OTHER PUBLICATIONS

Hashi, Makino, Kido, "Spoken Word Recognition etc.", Seventh International Congress on Acoustics, Budapest, 1971.

Primary Examiner—Kathleen H. Claffy
Assistant Examiner—E. S. Kemeny
Attorney, Agent, or Firm—Kenway & Jenney

[57] ABSTRACT

In the speech recognition apparatus disclosed herein, an audio signal is digitized and a succession of short-term power spectra are generated over a time interval corresponding to a spoken word. The short-term power spectra are frequency band equalized as a function of the peak amplitude occurring in each frequency band over the word interval. The changes in amplitude in each frequency band are weighted and summed to obtain a cumulative measure of subjective time and then a limited number of frequency band equalized spectra are selected as representing equal intervals of subjective time so as to suppress variations in rate of articulation. The selected spectra are then non-linearly sealed in amplitude and transformed so as to maximize the separation between phonetically different sounds. By means of a maximum-likelihood method, the transformed selected spectra are compared with a data base representing a vocabulary to be recognized.

10 Claims, 3 Drawing Figures

SPEECH RECOGNITION APPARATUS

BACKGROUND OF THE INVENTION

The present invention relates to speech recognition apparatus and more particularly to such apparatus in which sequentially generated spectra are equalized and selected to improve accuracy of recognition upon comparison with data representing a vocabulary to be recognized.

Various speech recognition systems have been proposed heretofore including those which attempt to recognize phonemes and attempt to recognize and determine the pattern of behavior of formant frequencies within speech. While these prior art techniques have achieved various measures of success, substantial problems exist. For example, the vocabularies which can be recognized are limited; the recognition accuracy is highly sensitive to differences between the voice characteristics of different talkers; and the systems have been highly sensitive to distortion in the speech signal being analyzed. This latter problem has typically precluded the use of such automatic speech recognition systems on speech signals transmitted over ordinary telephone apparatus, even though such signals were easily capable of being recognized and understood by a human observer.

Among the objects of the present invention may be noted the provision of speech recognition apparatus providing improved accuracy of recognition; the provision of such apparatus which is relatively insensitive to frequency distortion of the speech signal to be recognized; the provision of such a system which is relatively insensitive to variations in speaking rate in the signal to be analyzed; the provision of such a system which will respond to different voices; and the provision of such apparatus which is of highly reliable and relatively simple and inexpensive instruction. Other objects and features will be in part apparent and in part pointed out hereinafter.

SUMMARY OF THE INVENTION

The speech recognition system of the present invention spectrum analyzes an audio signal to determine the behavior of formant frequencies over an interval of time corresponding to a spoken word or phrase. Repeatedly within the interval, a short-term power spectrum is generated representing the amplitude or power spectrum of the audio signal in a brief subinterval. For each frequency band in the short-term power spectra, the maximum value occurring over the interval is determined, thereby obtaining a peak power spectrum over the interval. This peak spectrum is smoothed by averaging each maximum value with values corresponding to adjacent frequency bands, the width of the overall band contributing to each average being approximately equal to the typical frequency separation between formant frequencies (about 100 Hz). For each of the originally obtained sequence of short-term power spectra, the amplitude value of each frequency band is divided by the corresponding value in the smoothed peak spectrum, thereby generating a corresponding sequence of frequency band equalized spectra. Comparison of a selected group of these frequency band equalized spectra with a data base identifying a known vocabulary provides improved recognition when the original speech signal has been subject to frequency distortion, e.g. by a telephone line transmission.

BRIEF DESCRIPTION OF THE DRAWINGS

Corresponding reference characters indicate corresponding parts throughout the several views of the drawings.

DESCRIPTION OF THE PREFERRED EMBODIMENT

In the particular preferred embodiment which is described herein, speech recognition is performed by an overall apparatus which involves both a specially constructed electronic system for effecting certain analog and digital processing of incoming speech signals and also a general-purpose digital computer which is programmed in accordance with the present invention to effect certain data reduction steps and numerical evaluations. The division of tasks between the hardware portion and the software portion of this system has been made so as to obtain an overall system which can accomplish speech recognition in real time at moderate cost. However, it should be understood that some of the tasks being performed in hardware in this particular system could as well be performed in software and that some of the tasks being performed by software programming in this example might also be performed by special-purpose circuitry in a different embodiment of the invention.

Figure 1:
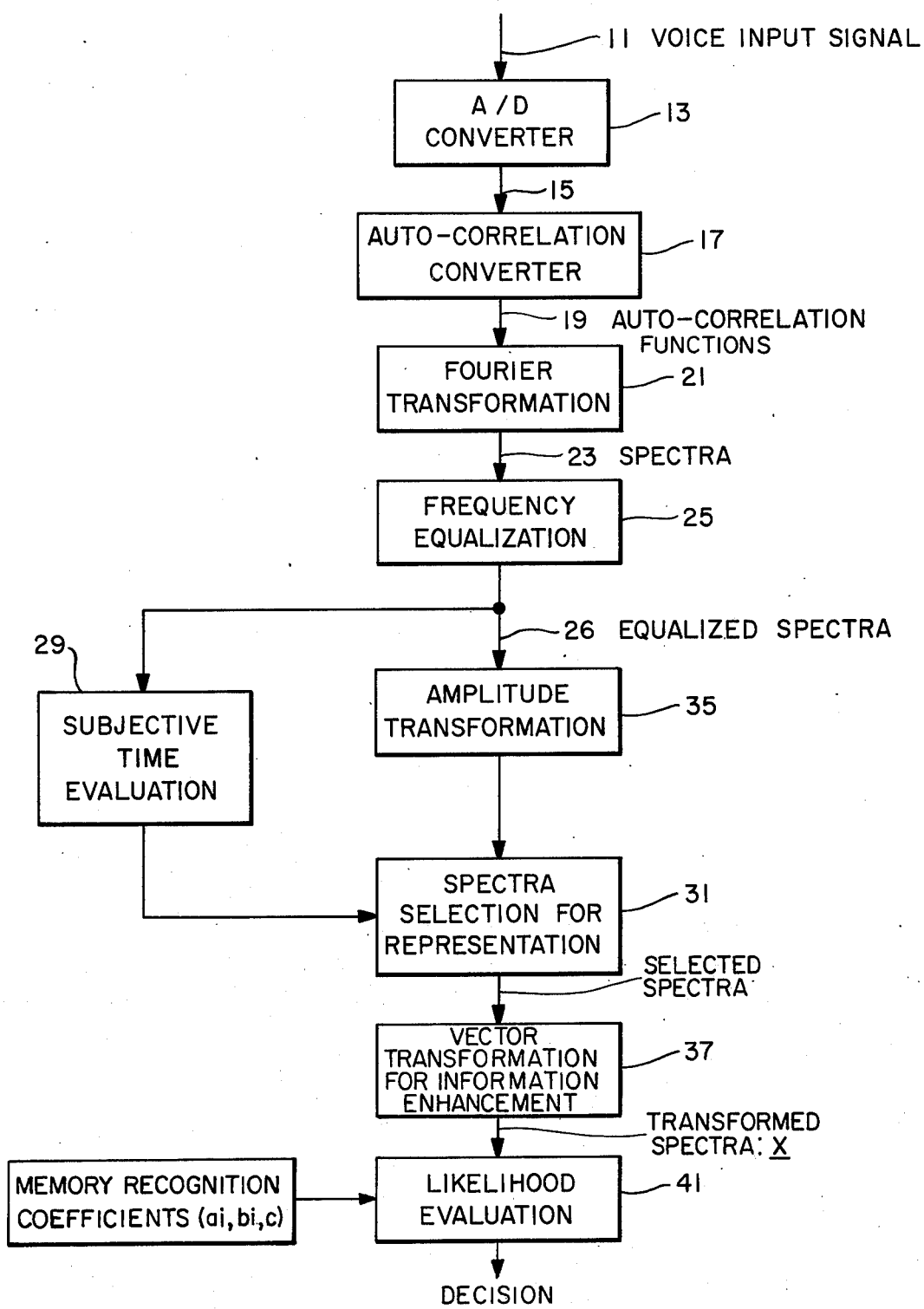
FIG. 1 is a flow chart illustrating the general sequence of operations performed in accordance with the practice of the present invention.

The successive operations performed by the present system in recognizing speech signals are illustrated in a general way in FIG. 1. It is useful, in connection with this initial description, to also follow through the various data rates which are involved so as to facilitate an understanding of the detailed operation described hereinafter. As indicated previously, one aspect of the present invention is the provision of apparatus which will recognize speech signals, even though those signals are frequency distorted, e.g. as by a telephone line. Thus, in FIG. 1, the voice input signal, indicated at 11, may be considered to be a voice signal received over a telephone line encompassing any arbitrary distance or number of switching interchanges.

As will become apparent in the course of the following description, the present method and apparatus are concerned with the recognition of speech segments containing a sequence of sounds or phonemes. In the following description and in the claims, reference is made to "an interval corresponding to a spoken word" since this is a convenient way of expressing a minimum length of time appropriate for encompassing a recognizable sequence of sounds. This term, however, should be broadly and generically construed so as to encompass a series of words in the grammatical sense, as well as a single word.

In the particular implementation illustrated, the interval corresponding to a spoken word is taken somewhat arbitrarily as a one second interval. Various techniques are known in the art for determining when to start or initiate this interval. In general, the particular technique used forms no part of the present invention. However, it is at present preferred that the interval be initiated when the input signal power, calculated as described hereinafter, exceeds a preset threshold more than half the time in a sliding window of about 30 consecutively generated spectra of the voice signal, digitized as described hereinafter.

After being amplitude normalized by an analog a.g.c. circuit, the voice signal is digitized, that is, the signal amplitude is converted to digital form. In the present example, an 8-bit binary representation of the signal amplitude is generated at a rate of 10,000 conversions per second. An autocorrelator 17 processes this input signal to generate an autocorrelation function 100 times per second, as indicated at 19. Each autocorrelation function comprises 32 values or channels, each value being calculated to a 24-bit resolution. The autocorrelator is described in greater detail hereinafter with reference to FIG. 2.

Figure 3:
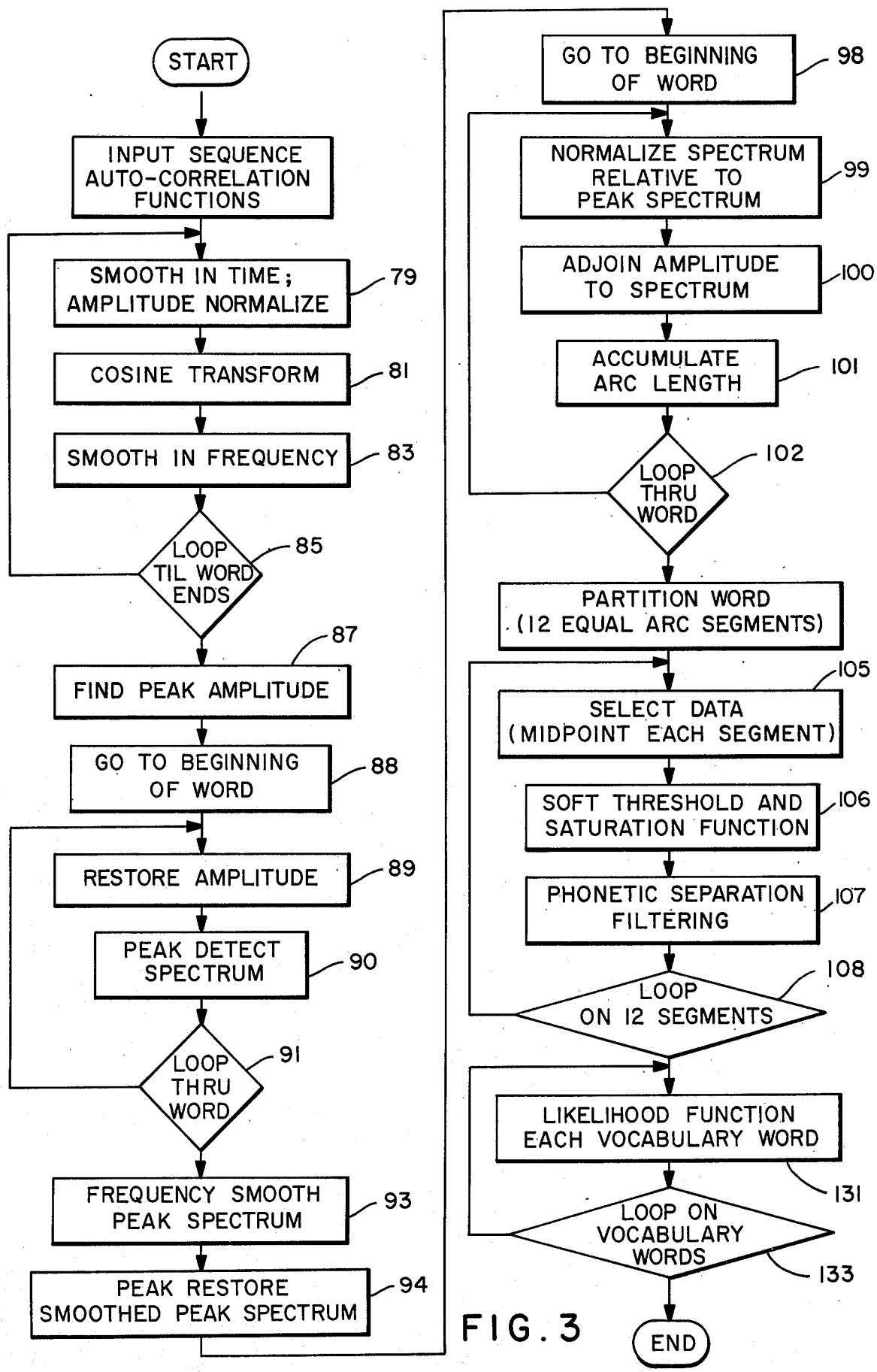
FIG. 3 is a flow diagram of a digital computer program performing certain subsequent procedures in the process of FIG. 1.

The autocorrelation functions 19 are subjected to Fourier transformation, as indicated at 21, so as to obtain corresponding power spectra 23. These "original" spectra are calculated at the same repetition rate as the autocorrelation functions, i.e. 32 channels each having a resolution of 16 bits. As will be understood, each of the 32 channels in each spectrum represents a frequency band. In the present embodiment, the Fourier transformation, as well as subsequent processing steps, are performed under the control of a general-purpose digital computer, appropriately programmed, utilizing a peripheral array processor for speeding the arithmetic operations required repeatedly in the present method. The particular computer employed is a model PDP11 manufactured by the Digital Equipment Corporation of Maynard, Massachusetts, and the programming described hereinafter with reference to FIG. 3 is substantially predicated upon the capabilities and characteristics of that commercially available computer.

Each of the successive short-term power spectra are frequency band equalized, as indicated at 25, this equalization being performed as a function of the peak amplitude occurring in each frequency band over the interval as described in greater detail hereinafter. Again, the equalized spectra, designated 26, are generated at the rate of 100 per second, each frequency band equalized spectra having 32 channels evaluated to 16-bit binary accuracy.

In order to compensate for differences in speaking rate, the system then performs a redistribution or compensation predicated on the passage of subjective time. While this compensation is described in greater detail hereinafter, it may for the present be noted that this evaluation consists essentially of the accumulation of the magnitude of all amplitude changes in all of the different frequency channels over the interval of interest. This accumulation is performed at 29. Since the recognition of speech to some extent depends upon the way in which formant frequencies shift, it can be seen that the rate of shift is indicative of the speaking rate. Further, such shifts will be reflected in changes in the amplitudes in the frequency channels involved.

The subjective time evaluation provides a basis for selection of a limited number of the frequency band equalized spectra within the interval, which selected samples are fairly representative of the spoken word. As indicated previously, the short-term power spectra themselves are generated at the rate of 100 per second. As will be understood, however, much of the data is redundant. In the practice of the present invention, it has been found that 12 of the frequency band equalized spectra provide an adequate representation of a short word or sequence of phonemes, appropriate for recognition purposes. The subjective time evaluation is therefore employed to divide the entire interval (approximately 1 second) into 12 periods of equal subjective time value and to select a corresponding short-term power spectra for each such period, the selection being performed at 31.

In order to facilitate the final evaluation of the spoken word, the amplitude values of the selected spectra are subjected to a non-linear scalar transformation, as indicated at 35. This transformation is described in greater detail hereinafter but it may be noted at this point that this transformation improves the accuracy with which an unknown speech signal may be matched with a reference vocabulary. In the embodiment illustrated, this transformation is performed on all of the frequency band equalized spectra, in parallel with the accumulation which evaluates subjective time and prior to the selection of representative samples. The actual comparison of the selected spectra with the data base is performed after a vector transformation, indicated at 37, the product of the vector transformation being applied to a likelihood evaluator indicated at 41.

Preprocessor

Figure 2:
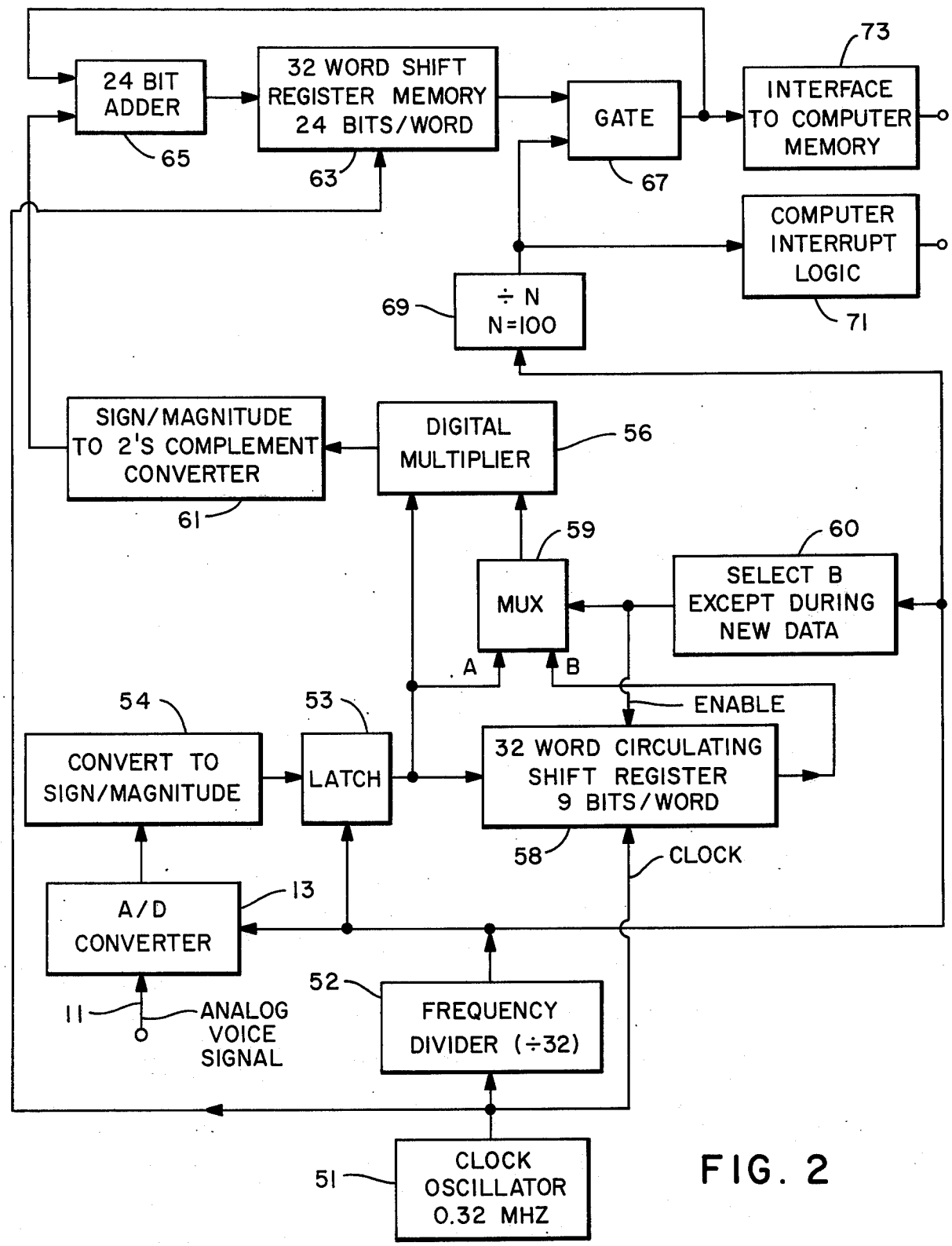
FIG. 2 is a schematic block diagram of electronic apparatus performing certain initial operations in the overall process illustrated in FIG. 1.

In the apparatus illustrated in FIG. 2, an autocorrelation function and an averaging function are performed digitally on a data stream generated by the analog-to-digital converter 13 which digitizes the analog voice signal 11. The digital processing functions, as well as the input analog-to-digital conversion are timed under the control of a clock oscillator 51. Clock oscillator 51 provides a basic timing signal at 320,000 pulses per second and this signal is applied to a frequency divider 52 so as to obtain a second timing signal at 10,000 pulses per second. This slower timing signal controls the analog-to-digital converter 13 together with a latch 53 which holds the 8-bit results of the last conversion until the next conversion is completed. Prior to being applied to the latch, the digital value is converted to a sign magnitude representation, as indicated at 54, from the usual representation provided by conventional analog digital converters, such as that indicated at 13.

The autocorrelation products desired are generated by a digital multiplier 56 together with a 32 word shift register 58 and appropriate control circuitry. The shift register 58 is operated in a recirculating mode and is driven by the faster clock frequency so that one complete circulation of data is accomplished for each analog-to-digital conversion. One input to the digital multiplier 56 is taken from the latch 53 while the other input to the multiplier is taken from the current output of the shift register, the multiplications being performed at the higher clock frequency. Thus, each value obtained from the conversion is multiplied with each of the preceding 31 conversion values. As will be understood by those skilled in the art, the signals thereby generated are equivalent to multiplying the input signal by itself delayed in time by 32 different time increments. To produce the zero-delay correlation (i.e. the power), a multiplexer 59 causes the current value to be multiplied by itself at the time each new value is being introduced into the shift register, this timing function being indicated at 60.

As will also be understood by those skilled in the art, the products from a single conversion together with its 31 predecessors will not be fairly representative of the energy distribution or spectrum of the signal over any reasonable sampling interval. Accordingly, the apparatus of FIG. 2 provides for the averaging of these sets of products.

To facilitate the additive process of averaging, the sign/magnitude/binary representation of the individual autocorrelation products generated by multiplier 56 is converted to a two's-complement code as indicated at 61. The accumulation process which effects averaging is provided by a 32-word shift register 63 which is interconnected with an adder 65 so as to form a set of 32 accumulators. Thus, each word can be recirculated after having added to it the corresponding increment from the digital multiplier. The circulation loop passes through a gate 67 which is controlled by a divider circuit 69 driven by the lower frequency clock signal. The divider 69 divides the lower frequency clock signal by a factor which determines the number of instantaneous autocorrelation functions which are to be accumulated or averaged before the shift register 63 is read out.

In the preferred example, it is assumed that 100 samples are accumulated before being read out. In other words, N for the divide-by-N divider is one hundred. After 100 samples have thus been transformed and accumulated, the timing circuit 69 triggers a computer interrupt circuit 71. At this time, the contents of the shift register 63 are read into the computer's memory through suitable interface circuitry 73, the 32 successive words in the register being presented successively to the interface. As will be understood by those skilled in the art, this reading in of data may be typically performed by a direct memory access procedure. Predicated on the averaging of 100 samples, and an initial sampling rate of 10,000 per second, it will be seen that 100 averaged autocorrelation functions will be provided to the computer every second. While the shift register contents are being read out to the computer, the gate 67 is closed so that each of the words in the shift register is effectively reset back to zero to permit the accumulation to begin again.

Expressed in mathematical terms, the operation of the apparatus shown in FIG. 2 may be described as follows. Assuming the analog-to-digital converter generates the time series $S(t)$, $S(t-T)$, $S(t-2T)$ . . . the digital correlator circuitry of FIG. 2 may be considered to compute the autocorrelation function $$\psi(j,t) = \sum_{k=1}^{100} S(t - kT) S(t - [k - j]T)$$

After an interval corresponding to a spoken word, the digital correlator will have transferred to the computer a series of data blocks representing the spoken word. Assuming that the interval of interest is in the order of one second, there will be 100 blocks of data, each comprising 32 words of 24 bits each. Further, each block of data represents an autocorrelation function derived from a corresponding sub-interval of the overall interval under consideration. In the embodiment illustrated, the processing of this data from this point on in the system is performed by a general-purpose digital computer, appropriately programmed. The flow chart which includes the function provided by the computer program is given in FIG. 3. Again, however, it should be pointed out that various of these steps could also be performed by hardware rather than software and that, likewise, certain of the functions performed by the apparatus of FIG. 2 could additionally be performed in the software by corresponding revision of the flow chart of FIG. 3.

Although the digital correlator of FIG. 2 performs some time averaging of the autocorrelation functions generated on an instantaneous basis, the averaged autocorrelation functions read out to the computer may still contain some anomalous discontinuities or unevennesses which might interfere with orderly processing and evaluation of the samples. Accordingly, each block of data is first smoothed with respect to time, i.e. with respect to adjacent channels defining the function, which channels correspond to successive delay periods. This is indicated in the flow chart of FIG. 3 at 79. The preferred smoothing process is a two-pole convolutional procedure in which the smoothed output $\psi_s(j,t)$ is given by $$\psi_s(j,t) = C_o\psi(j,t) + C_1\psi_s(j,t-100T) + C_2\psi_s(j,t-200T)$$

where $\psi(j,t)$ is the unsmoothed input autocorrelation and $\psi_s(j,t)$ is the smoothed output autocorrelation for the $j$ th value of time delay; $t$ denotes real time; and $T$ denotes the time interval between consecutively generated autocorrelation functions (equal to 0.0001 second in the preferred embodiment). The constants $C_0$, $C_1$, $C_2$ are chosen to give the smoothing function an approximately Gaussian impulse response with a frequency cutoff of approximately 20 Hz. As indicated, this smoothing function is applied separately for each delay $j$. As indicated at 81, a cosine Fourier transform is then applied to each autocorrelation function so as to generate a 32-point power spectrum. The spectrum is defined as $$S(kfo) = \frac{1}{2} \psi_s(o,t) + \sum_{j=1}^{31} \psi(j,t) \cos 2\pi f_o jK$$

As will be understood, each point or value within each spectrum represents a corresponding band of frequencies. While this Fourier transform can be performed completely within the conventional computer hardware, the process is speeded considerably if an external hardware multiplier or Fast-Fourier-Transform peripheral device is utilized. The construction and operation of such modules are well known in the art, however, and are not described in detail herein. After the cosine Fourier transform has been applied, each of the resulting power spectra is smoothed, at 83, by means of a Hamming window. As indicated, these functions are performed on each block of data and the program loops, as indicated at 85, until the overall word interval, about one second, is completed.

As the successive short-term power spectra representing the word interval are processed through the loop comprising steps 79–85, a record is kept of the highest amplitude occurring within each frequency band. Initially the peak amplitude occurring in the entire word is searched out or detected, as indicated at 87. Starting at the beginning of the word (Step 88) a loop is then run, comprising steps 89–91 which detects the peak occurring within each frequency band and these peak values are stored. At the end of the word interval, the peak values define a peak spectrum. The peak spectrum is then smoothed by averaging each peak value with values corresponding to adjacent frequencies, the width of the overall band of frequencies contributing to the average value being approximately equal to the typical frequency separation between formant frequencies. This step is indicated at 93. As will be understood by those skilled in the speech recognition art, this separation is in the order of 1000 Hz. By averaging in this particular way, the useful information in the spectra, that is, the local variation in formant frequencies, is retained whereas overall or gross emphasis in the frequency spectrum is suppressed. The overall peak amplitude, determined at step 87, is then employed to restore the peak amplitude of the smoothed peak spectrum to a level equal to the original peak amplitude. This step is indicated at 94 and is employed to allow maximum utilization of the dynamic range of the system.

After obtaining the smoothed peak amplitude spectrum, the successive individual short-term power spectra representing the incoming audio signal are frequency compensated by dividing the amplitude value for each frequency band within each short-term power spectrum by the corresponding value in the smoothed peak spectrum. This step is indicated at 99, being part of a loop which processes the entire word and which comprises steps 98-102. This then generates a sequence of frequency band equalized spectra which emphasize changes in the frequency content of the incoming audio signal while suppressing any generalized frequency emphasis or distortion. This method of frequency compensation has been found to be highly advantageous in the recognition of speech signals transmitted over telephone lines compared to the more usual systems of frequency compensation in which the basis for compensation is the average power level, either in the whole signal or in each respective frequency band.

At this point, it is useful to point out that, while the successive short-term power spectra have been variously processed and equalized, the data representing the spoken word still comprises in the order of 100 spectra, each spectrum having been normalized and frequency compensated in such a way that shifts in individual formant frequencies from one short-term power spectra to another are emphasized.

As in various prior art systems, the speech recognition performed by the procedure of the present invention utilizes the patterns and shifts in patterns of formant frequencies to recognize words in its vocabulary. In order to permit the recognition of pattern shifts even if speaking rate is varied, the preferred embodiment of the system generates a parameter which may be considered to be a measurement of subjective time. In the present system, a value corresponding to this parameter is generated relatively simply by accumulating or summing the absolute values of the change in the amplitude of each frequency band from one successive frequency band equalized spectrum to the next and summing over all the frequencey bands as well. If the spectrum, valued over 32 frequency bands, is considered to be a vector in 32 dimensions, the movement of the tip of this vector from one spectrum to the next may be considered to be an increment of arc length. Further, the sum of the changes in the various dimensions is a sufficiently accurate representation of arc length for this purpose. By accumulating the arc length increments over the entire word interval, a cumulative arc length may be obtained. Accordingly, when the speaker stretches out a phoneme in his pronunciation, the accumulation of arc length will grow only very slightly and yet will grow quickly when the speaking rate is accelerated. The accumulation process is indicated at 101 in FIG. 3.

Preferably, the contributions from the different frequency bands are weighted, prior to this latter summing, so that the phonetically more significant frequencies exert a greater effect. In other words, the magnitude of the amplitude change, in each frequency band, between two consecutively evaluated spectra is multiplied by a constant weighting factor associated with that frequency band. The weighted magnitudes of the changes are then summed over all the frequency bands to yield the increment of subjective time elapsed between the two spectra.

Changes that occur in the frequency range normally occupied by the lowest three formant resonances of the vocal tract are found to be much more valuable in correcting for the rate of articulation than changes at higher frequencies. In fact, the relative contributions at frequencies above 2500 Hz are so low that the weights in these frequency bands may be set to zero with no statistically significant effect on the results.

A table of the weighting factors, optimized for the preferred embodiment in a particular practical application of the method, is presented below. The values given are not intended to be restrictive, and in fact the optimum values may depend on the particulars of the spectrum analysis method employed, the vocabulary of words to be recognized, and the sex and age of the talkers. These values do, however, represent an effort to reach a best compromise for talker-independent recognition of a general English vocabulary.

| Frequency band Center, Hz | Relative Weighting Factor |
|---|---|
| 0 | 0.254 |
| 159 | 0.261 |
| 317 | 0.736 |
| 476 | 1.000 |
| 635 | 0.637 |
| 794 | 0.377 |
| 952 | 0.240 |
| 1111 | 0.264 |
| 1270 | 0.377 |
| 1429 | 0.470 |
| 1587 | 0.381 |
| 1746 | 0.254 |
| 1905 | 0.181 |
| 2063 | 0.079 |
| 2222 | 0.025 |
| 2381 | 0.002 |

When a value or parameter representing the total arc length is obtained, it is then divided into 12 equal increments. For each such increment one block of data representing a representative frequency band equalized spectrum is selected, as indicated at 105. Thus, the number of frequency band equalized spectra required to represent the sample interval is reduced by a factor of about eight. However, it should be understood that, due to the so-called subjective time evaluation, this is not equivalent to selecting one sample for every eight spectra calculated. The original sampling rate is constant with respect to absolute time but the selected samples will be equally spaced with respect to subjective time, i.e., as measured in accordance with the method described above.

Either just prior to or just following the selection process, the spectra are subjected to an amplitude transformation, indicated at 107, which effects a non-linear scaling. Assuming the individual spectra to be designated as $S(f,t)$, where $f$ indexes the different frequency bands and $t$ denotes real time, the non-linearly scaled spectrum $S_1(f,t)$ is the linear fraction function $$S_1(f,t) = \frac{S(f,t) - A}{S(f,t) + A}$$

where $A$ is the average value of the spectrum defined as follows:

$$A = \frac{1}{32} \sum_{j=1}^{32} S(j,t)$$

This scaling produces a soft threshold and gradual saturation effect for spectral intensities which deviate greatly from the short-term average A. For intensities nearer each average, the function is approximately linear. Further from the average, it is approximately logarithmic and at extreme values it is nearly constant. On a logarithmic scale, the function $S_1(f,t)$ is symmetric about zero and the function exhibits threshold and saturation behavior that is suggestive of an auditory nerve firing rate function. In practice, the overall recognition system performs significantly better with this particular non-linear scaling function than it does with either a linear or a logarithmic scaling of the spectrum amplitudes.

A linear matrix operation next transforms the equalized spectrum into a set of coefficients in which phonetic attributes of the processed speech are enhanced. Symbolically, the transformation applies coefficients $p_{ij}$ linearly to the spectrum to obtain numerical values for a set of feature data $x_i$:

$$x_i(t) = \sum_{j=1}^{32} p_{ij} S(j,t). \tag{1}$$

The coefficients are evaluated from a sample collection of spoken word inputs to be recognized so that the average value of $x_i$ is a minimum when the input signal is in the ith predefined phonetic class, while $x_i$ is as large as possible if the input belongs to a class other than the ith class. The coefficients $P_{ij}$ which best satisfy one or the other of these criteria can be evaluated by analyzing examples of known speech input waveforms using well-known statistical techniques of linear system theory, multidimensional scaling theory, and factor analysis.

For the purpose of evaluating the transformation coefficients $P_{ij}$, a "phonetic class" is defined to contain whatever sound occurs at one of the sequentially numbered selected samples of a designated word of the vocabulary to be recognized. Even though the same nominal phoneme may occur in different words or in different syllables of the same word, the acoustic properties of the sound become modified, often substantially, by the surrounding phonetic context; hence the phonetic classes employed here are context-specific.

It is possible to take advantage of this contextual modification by having an increased number of linear transformation coefficients $p_{ij}$ act simultaneously on two or more consecutively selected spectra. This alternate procedure, while more complex, differentiates syllables more reliably than the phonetic transformation differentiates phonemes.

The selected, transformed data $$\underline{x} = \{x_i(t_k), i = 1 \ldots 32; k = 1 \ldots 12\} \tag{2}$$

are finally applied as inputs to a statistical likelihood calculation, indicated at 131. This processor computes a measure of the probability that the unknown input speech matches each of the reference words of the machine's vocabulary. Typically, each datum $x_i(t_k)$ has a slightly skew probability density, but nevertheless is well approximated statistically by a normal distribution with mean value $m(i,k)$ and variance $[s(i,k)]^2$. The simplest implementation of the process assumes that the data associated with different values of $i$ and $k$ are uncorrelated, so that the joint probability density for all the data $\underline{x}$ comprising a given spoken word input is (logarithmically)

$$\ln p(\underline{x}) = - \sum_{i,k} \ln \sqrt{2\pi s(i,k)} - \frac{1}{2} \left[ \frac{x_i(t_k) - m(i,k)}{s(i,k)} \right]^2 \tag{3}$$

which can be rewritten as:

$$\ln p(\underline{x}) = - \sum_{i,k} \ln \sqrt{2\pi s(i,k)} + \sum_{i,k} \left( - \frac{1}{2 s(i,k)^2} \right) (x_i(t_k) - m(i,k))^2 \tag{4}$$

or $$X = c + \sum_r b_r (x_r - M_r)^2 \tag{5}$$

where $r$ is indexed over all $i$ and $k$. Since the logarithm is a monotonic function, this statistic is sufficient to determine whether the probability of a match with one vocabulary word is greater or less than the probability of a match with some other vocabulary word. Each word in the vocabulary has its hown set of statistical reference parameters $m(i,k)$, $s(i,k)$. Each of these sets of parameters is compared with the set of data until the input speech has been tested against all the words of the vocabulary. The resulting statistical table ranks the various vocabulary choices in accordance with their relative likelihood of occurrence.

The determination of $p_{ij}$ and the set of coefficients ($a_i$, $b_i$, $c$) or the equivalent ($m_i$, $k$, $s(i,k)$) is well known in the pattern recognition art as described in Atal, *Automatic Speaker Recognition Based on Pitch Contours*, JOSA, 52, pp. 1687–1697 (1972); and Klein et al., *Vowel Spectra, Vowel Spaces, and Vowel Identification*, JOSA, 48, pp. 999–1009 (1970).

As will be understood by those skilled in the art, this ranking constitutes the speech recognition insofar as it can be performed from single word samples. This ranking can be utilized in various ways in an overall system depending upon the ultimate function to be performed. In certain systems, e.g. telephonic data entry, a simple first choice trial and error system may be entirely adequate. In others it may be desired to employ contextual knowledge or conventions in order to improve the accuracy of recognition of whole sentences. Such modifications, however, go beyond the scope of the present inventions and are not treated herein.

As indicated previously, a presently preferred embodiment of the invention was constructed in which signal and data manipulation, beyond that performed by the preprocessor of FIG. 2, was implemented by a Digital Equipment Corporation PDP 11 computer.

The detailed programs which provide the functions described in relation to the flow chart of FIG. 3 do not form part of the invention. It would be well within the skill of one skilled in the programming arts to prepare an appropriate instruction list to implement the functions described in the flow chart of FIG. 3.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a speech analysis system in which an audio signal is spectrum analyzed to determine the behavior of formant resonances over an interval of time, a frequency compensation method comprising:

repeatedly within said interval, evaluating a set of parameters determining the short-term power spectrum of said audio signal in a subinterval within the said interval, thereby to generate a sequence of short-term power spectra;

for each parameter in the set, determining the maximum value of the parameter occurring over the interval, the set of maximum values thereby determined corresponding to a peak spectrum over the interval;

smoothing the peak spectrum by averaging each maximum value with values from said set of maximum values corresponding to adjacent frequencies, the width of the band of frequencies contributing to each averaged value being approximately equal to the typical frequency separation between formant frequencies; and for each short-term power spectrum in said sequence of spectra, dividing the value for each parameter in the set by the corresponding smoothed maximum value in the smoothed peak spectrum, thereby to generate over said interval a sequence of frequency band equalized spectra corresponding to a compensated audio signal having the same maximum short-term energy content in each of the frequency bands comprising the spectrum.

2. In a speech analysis system in which an audio signal is analyzed over an interval corresponding to a spoken word to determine the behavior of formant resonances relative to a sequence of reference vectors representing a preselected word, a method of selecting sample points within said interval comprising:

repeatedly over said interval, evaluating a set of parameters corresponding to the energy spectrum of said signal at that time, each such set of values being characterizable as a vector having a coordinate corresponding to each parameter;

summing over the said set of parameters the magnitudes of the values of the changes that occur between successive evaluations of each parameter, thereby to obtain a value corresponding to the arc length increment traversed by the multi-coordinate vector during the subinterval between successive evaluations;

accumulating the arc length increments over successive subintervals so as to obtain a sequence of arc lengths throughout the said interval and a total arc length for the said interval;

dividing the total arc length into a sequence of equal length segments corresponding in number to the number of vectors in the sequence of reference vectors;

separating said sequence of arc lengths into groups, the cumulative arc length for each group being substantially equal to said equal length segments; and for each segment, selecting a set of parameter values defining a representative vector from the vectors associated with the corresponding group of arc lengths and comparing the selected set with the parameter values defining the corresponding recognition vector, the several comparisons so performed being indicative of the match between the audio signal and the speech corresponding to the recognition vectors.

3. A speech analysis system as set forth in claim 2 wherein the magnitudes of the changes that occur between successive evaluations of each parameter are multiplied by a respective predetermined weighting factor prior to summing the set of parameters, thereby to emphasize the importance of changes in certain of the parameters and to de-emphasize changes in other parameters.

4. In a speech analysis system in which an audio signal is analyzed over an interval corresponding to a spoken word to determine the behavior of formant resonances relative to a sequence of reference vectors representing a preselected word, a method of obtaining and selecting sample points within said interval comprising:

repeatedly within said interval, evaluating a set of parameters determining the short-term power spectrum of said audio signal in a subinterval within the said interval, thereby to generate a sequence of shot-term power spectra;

for each parameter in the set, determining the maximum value of the parameter occurring over the interval, the set of maximum values thereby determined corresponding to a peak spectrum over the interval;

smoothing the peak spectrum by averaging each maximum value with values from said set of maximum values corresponding to adjacent frequencies, the width of the band of frequencies contributing to each averaged value being approximately equal to the typical frequency separation between formant frequencies;

for each short-term power spectrum in said sequence of spectra, dividing the value for each parameter in the set by the corresponding smoothed maximum value in the smoothed peak spectrum, thereby to generate over said interval a sequence of frequency band equalized spectra corresponding to a compensated audio signal having the same maximum short-term energy content in each of the frequency bands comprising the spectrum, each such set of equalized parameters being characterizable as a vector having a coordinate corresponding to each parameter;

summing over the said set of equalized parameters the magnitudes of the values of the changes that occur between successive evaluations of each equalized parameter, thereby to obtain a value corresponding to the arc length increment traversed by the multi-coordinate vector during the subinterval between successive evaluations;

accumulating the arc length increments over successive subintervals so as to obtain a sequence of arc lengths throughout the said interval and a total arc length for the said interval;

dividing the total arc length into a sequence of equal length segments corresponding in number to the number of vectors in the sequence of reference vectors;

separating said sequences of arc lengths into groups, the cumulative arc length for each group being substantially equal to said equal length segments; and for each segment, selecting a set of equalized parameter values defining a representative vector from the vectors associated with the corresponding group of arc lengths and comparing the selected set with the parameter values defining the corresponding reference vector, the several comparisons so performed being indicative of the match between the audio signal and the speech corresponding to the reference vectors.

5. In a speech analysis system, a method of enhancing the information content of the spectrum of an audio signal representing speech, said method comprising:

generating a set of values S(f) corresponding to the energy spectrum of said signal, each value representing the energy in a corresponding frequency band f;

generating a value A corresponding to the average of said set of N values, where $$A = \frac{1}{N} \sum_{j=1}^{N} S(jFo)$$

and $F_o$ represents the width of each frequency band; and for each value in said set, generating a corresponding non-linearly scaled value $S_s(f)$, where $$S_s(f) = \frac{S(f) - A}{S(f) + A}$$

6. In a speech analysis system in which an audio signal is spectrum analyzed to determine the behavior of formant resonances over an interval of time, a frequency compensation and amplitude scaling method comprising:

repeatedly within said interval, evaluating a set of parameters determining the short-term power spectrum of said audio signal in a subinterval within the said interval, thereby to generate a sequence of short-term power spectra;

for each parameter in the set, determining the maximum value of the parameter occurring over the interval, the set of maximum values thereby determined corresponding to a peak spectrum over the interval;

smoothing the peak spectrum by averaging each maximum value with values from the set of maximum values corresponding to adjacent frequencies, the width of the band of frequencies contributing to each averaged value being approximately equal to the typical frequency separation between formant frequencies;

for each short-term power spectrum in said sequence of spectra, dividing the value for each parameter in the set by the corresponding smoothed maximum value in the smoothed peak spectrum, thereby to generate for each spectrum, a corresponding frequency band equalized spectrum comprising a set of equalized parameters S(f);

generating a value A corresponding to the average of said set of N values, where $$A = \frac{1}{N} \sum_{j=1}^{N} S(jFo)$$

and $F_o$ represents the width of each frequency band; and non-linearly scaling each spectrum by generating, for each value S(f) in each frequency band equalized spectrum, a corresponding value $S_s(f)$, where $$S_s(f) = \frac{S(f) - A}{S(f) + A}$$

7. In a speech recognition system, a method of comparing the spectrum of an audio signal representing speech with a vector of recognition coefficients ($a_i$, $b_i$, $c$), said method comprising:

generating a set of parameters S(f) corresponding to the short-term power spectrum of said signal, each parameter representing the energy in a corresponding frequency band f;

generating a value A corresponding to the average of said set of N parameters, where $$A = \frac{1}{N} \sum_{j=1}^{N} S(jFo)$$

and $F_o$ represents the width of each frequency band;

for each parameter in said set, generating a corresponding non-linearly scaled value $S_s(f)$, where $$S_s(f) = \frac{S(f) - A}{S(f) + A};$$

generating from these values a set of linearly scaled values $L_k$, where $$L_k = \sum_{j=1}^{N} P_{jk} S_s(jFo); \quad k = 1, \ldots, M;$$

where the constant coefficients $P_{jk}$ enhance the phonetic attributes of the processed speech and are independent of the particular speech patterns represented by the coefficients ($a_i$, $b_i$, $c$), and M equals the number of possible decision choices, and generating a numerical comparison value X, where $$X = c + \sum_{i=1}^{M} b_i (L_i - a_i)^2$$

the comparison value being indicative of the match between the audio signal and the speech represented by the recognition coefficients.

8. A speech recognition system as set forth in claim 7 wherein the set of parameters S(f) is generated repeatedly over an interval corresponding to at least one spoken word, each such set of parameters being characterizable as a vector having a coordinate corresponding to each parameter;

summing over the said set of parameters the magnitudes of the values of the changes that occur between successive evaluations of each parameter, thereby to obtain a value corresponding to the arc length increment traversed by the multi-coordinate vector during the subinterval between successive evaluations;

accumulating the arc length increments over successive subintervals so as to obtain a sequence of arc lengths throughout the said interval and a total arc length for the said interval;

dividing the total arc length into a sequence of equal length segments corresponding in number to the number of vectors in the sequence of reference vectors;

separating said sequence of arc lengths into groups, the cumulative arc length for each group being substantially equal to said equal length segments; and for each segment, selecting said set of parameter values $S(f)$ defining a representative vector from the vectors associated with the corresponding group of arc lengths and comparing the selected set with the parameter values defining the corresponding recognition vector, the several comparisons so performed being indicative of the match between the audio signal and the speech corresponding to the recognition vectors.

9. A speech recognition system as set forth in claim 8 wherein the set of parameters $S(f)$ is generated repeatedly within an interval corresponding to at least one spoken word;

for each parameter in the set, determining the maximum occurring over the interval, the set of maximum values thereby determined corresponding to a peak spectrum over the interval;

smoothing the peak spectrum by averaging each maximum value with values corresponding to adjacent frequencies, the width of the band of frequencies contributing to each averaged value being approximately equal to the normal frequency separation between formant frequencies; and for each set $S(f)$, dividing each parameter therein by the corresponding smoothed maximum value in the smoothed peak spectrum, thereby to generate a set of frequency band equalized spectra corresponding to a frequency compensated audio signal over said interval.

10. A speech recognition system as set forth in claim 7 wherein the set of values $S(f)$ is generated repeatedly within an interval corresponding to at least one spoken word;

for each value in the set, determining the maximum occurring over the interval, the set of maximum values thereby determined corresponding to a peak spectrum over the interval;

smoothing the peak spectrum by averaging each peak value with values corresponding to adjacent frequencies, the width of the band of frequencies contributing to each averaged value being approximately equal to the normal frequency separation between formant frequencies; and for each set $S(f)$, dividing each value therein by the corresponding value in the smoothed peak spectrum, thereby to generate a set of frequency equalized spectra corresponding to the energy content of said audio signal over said interval, the values in the equalized spectra being utilized to generate the non-linearly scaled values $S_s(f)$.

* * * * *

UNITED STATES PATENT AND TRADEMARK OFFICE
CERTIFICATE OF CORRECTION

PATENT NO. : 4,038,503
DATED : July 26, 1977
INVENTOR(S) : Stephen L. Moshier

It is certified that error appears in the above-identified patent and that said Letters Patent are hereby corrected as shown below:

In the ABSTRACT, line 13, "sealed" should be --scaled--.

Column 1, line 58, "(about 100 Hz)" should be --(about 1000 Hz)--.

Column 8, line 30 but before the Table, insert the following --Table of weighting factors for subjective time calculation--.

Column 9, line 25, "the" should be --each--.

Column 10, line 34, "hown" should be --own--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*